Patented June 10, 1930

1,762,165

UNITED STATES PATENT OFFICE

HERBERT W. EMERY, OF HOLLISTON, MASSACHUSETTS, ASSIGNOR TO ARCHER RUBBER COMPANY, OF MILFORD, MASSACHUSETTS, A CORPORATION OF MASSACHUSETTS

SURFACE-FINISHED RUBBER GOODS AND PROCESS OF MAKING THE SAME

No Drawing. Application filed November 3, 1926. Serial No. 146,064.

This invention relates to a process of imparting a surface finish to rubber goods, and, while appurtenant to rubber goods of various character, is particularly applicable to rubberized sheeting consisting of a fabric backing coated on either or both faces with a rubber compound. Such sheeting is commonly utilized in the manufacture of waterproof garments, hand bags, tobacco pouches, and the like.

It is the object of the present invention to produce a rubberized or rubber coated sheeting having a permanent dull or lusterless finish and a smooth, hard surface. Such dull-finished sheeting is not subject to change of appearance, which is inherent in rubberized sheeting possessing a luster finish, so-called,—this latter material acquiring surface cracks or scratches when handled, as during stitching operations, and giving a wrinkled appearance.

In accordance with the process of the present invention, the fabric sheet backing, e. g., cotton cloth, is rubberized on either or both faces by calendering or spreading the rubber compound thereon. Either of these operations produces a rubberized sheeting which possesses more or less natural luster, the calendered sheeting having a genuine luster as a result of being polished by passage between the nip of the nicely finished calender rolls. A finely divided filling material, e. g., starch, which functions as a luster-removing agent, is then applied to the surface of the rubber. Only a very small amount of material is applied to the rubber surface, since otherwise a white effect rather than a lusterless appearance would result. The product is cured or vulcanized, as usual.

The surface of the cured product is finally hardened by treating or halogenizing it with a free halogen or a sulphur halide. The hardening treatment may be carried out by passing the cured or vulcanized product through an atmosphere of the halogenizing agent, or by applying a solution of such agent to the surface thereof. The surface-hardened product may finally be neutralized as by passage through an atmosphere of ammonia. By such treatment, the fine particles of the luster-removing agent become firmly embedded in the hardened surface of the rubber to produce a permanent dull or lusterless finish. The hardened, dull surface is not susceptible of surface scratching and the dull finish is not removable by water, but persists during the life of the material.

To produce a calendered, rubberized sheeting, for example, having the surface characteristics herein described, a procedure may be adopted substantially as follows. Crude rubber may be compounded with sulphur and various ingredients, such as softeners, accelerators, fillers and pigments, to produce the rubber compound desired for rubberizing the fabric. Of course, the rubber mix may be varied as desired, depending upon the characteristics which it is desired to impart to the rubber coating.

The rubber compound may be calendered on to the fabric backing to the desired thickness. Preferably the backing is stained or impregnated on its non-coated surface prior to calendering, by spreading a relatively dilute rubber solution thereon. This renders the backing water-resistant and also imparts thereto the property of "closing up" perforations formed therein with a needle, pin, or the like.

The rubber calendered sheet possesses a shiny or lustrous surface, as a result of passage between the nicely finished calender rolls. After the calendering operation, a luster-removing material is applied to the rubber surface. I have found that a finely divided filling material, such as starch, e. g., potato starch, corn starch, or tapioca flour, serves admirably for such purpose. The starch may be applied to the rubber by any suitable method and means, as by dusting or scooping it by hand thereonto, or by passing the sheeting through a starch box, so-called, in which the rubber surface contacts with a supply of starch which is maintained in front of a doctor under which the sheeting is propelled. After the starch is applied, the excess may be removed by passing the sheeting in intimate contact with rotating brushes.

The surface of the sheeting is preferably then washed to ensure the removal of any excess starch which may remain. As a result, substantially only that portion of the starch which has become embedded in or permanently adherent to the rubber remains. The washing is preferably effected with a volatile material, such as carbon tetrachloride or benzine, to enable a quick removal thereof. The product may then be festooned over pipes or bars in the usual dry heat or steam heat vulcanizer, and cured at the desired temperature for the necessary period of time, depending upon the composition of the rubber compound.

After curing, the surface of the rubber is hardened by halogenization or treatment one or more times, either in an atmosphere of free halogen or a sulphur halide, or with a solution thereof. The surface of the rubber may, for example, be treated with a solution of sulphur chloride in carbon tetrachloride.

The product has a smooth, hard surface and a permanent lusterless finish. If desired, the product may be neutralized as by passage through an atmosphere of ammonia.

Where the spreading process is employed in rubberizing or rubber-coating the fabric, the rubber compound need not contain sulphur and the rubberized sheeting may be cold-cured between spreads with sulphur chloride, as is customarily practised. After the fabric has been finally rubberized and cured, it possesses a more or less lustrous surface. Starch of fine mesh may be applied to the surface of the rubber, and the product may be washed and surface-hardened, as previously.

Where the rubber compound has been applied to the fabric by calendering, a soap solution may be applied to the surface of the rubber prior to the application of the starch. A thin film of soap, as generally known, destroys in large measure the tackiness at the surface of the rubber, so that only a small quantity of starch becomes embedded and retained in the surface thereof. Similarly, a soap solution may be applied to the surface of a fabric rubberized by the spreading process, after the last coating of rubber has been spread thereon.

In place of the starch, other finely divided luster-removing agents, such as asbestine, aluminum flake, talc, mica dust, or the like, may be employed. Furthermore, the surface-hardening or halogenization of the rubber may be effected in an atmosphere or with a solution of bromine, sulphur bromide, or a mixture of free halogen or sulphur halides, or both.

I am aware of the fact that various finely divided materials have been dusted on to the surface of rubber goods to render the rubber non-tacky and to impart a lusterless finish thereto. Such goods, however, become spotted by water or rain, from the fact that the finely divided material is present in excess and is readily washed off. Furthermore, the surface of said goods becomes streaky by handling, which also tends to remove the finely divided material. The product as made by the process of the present invention, however, possesses a permanent dull finish and is not subjected to spotting by water or handling, owing to the fact that substantially all the luster-removing material is firmly embedded in a hardened surface which is resistant to streaking and scratching.

Having thus described the nature of this invention and a way of making and using the same, although without attempting to set forth all the forms in which it may be made or all the modes of its use.

What I claim is:

1. A process of imparting a permanent lusterless appearance to rubber-coated sheeting the rubber of which is compounded with sulphur, which comprises applying a finely divided luster-removing material to the rubber surface of the sheeting, washing the rubber surface to remove excess material therefrom, heat vulcanizing the sheeting completely, and then superficially hardening the rubber.

2. A process of imparting a permanent lusterless appearance to rubber-coated sheeting the rubber of which is compounded with sulphur, which comprises applying finely divided starch to the rubber surface of the sheeting, washing the rubber surface with a volatile solvent to remove the excess starch therefrom, heat vulcanizing the sheeting completely, and then superficially halogenizing the rubber.

3. A process of imparting a permanent lusterless appearance to rubber calendered sheeting the rubber of which is compounded with sulphur, which comprises successively applying a soap solution and finely divided starch to the rubber surface of the sheeting completely, washing the rubber surface with carbon tetrachloride to remove the excess starch therefrom, heat vulcanizing the sheeting, and finally superficially halogenizing the rubber.

In testimony whereof I have affixed my signature.

HERBERT W. EMERY.